3,423,248
GAS DIFFUSION ELECTRODE FOR ELECTRO-
CHEMICAL FUEL CELLS AND METHOD OF
MAKING SAME
Heinz-Gunther Plust, Hanflandli, Spreitenbach, Aargau,
Switzerland, assignor to Aktiengesellschaft Brown,
Boveri & Cie., Baden, Switzerland, a joint-stock company
Filed Sept. 14, 1964, Ser. No. 396,094
Claims priority, application Switzerland, Oct. 8, 1963,
12,344/63
U.S. Cl. 136—120                                   6 Claims
Int. Cl. H01m 27/04

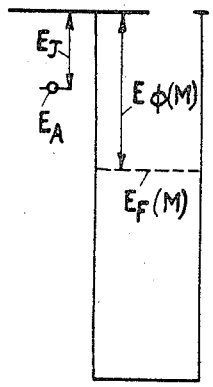
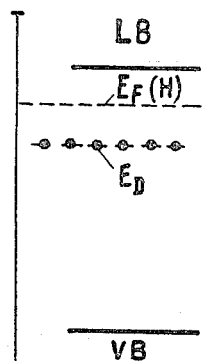
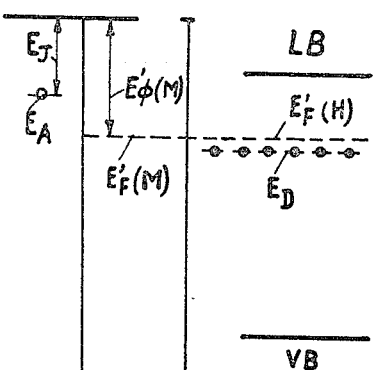
Fig. 5            Fig. 5a
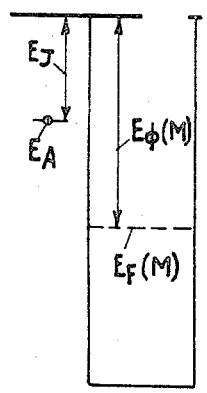
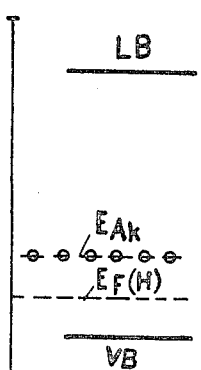
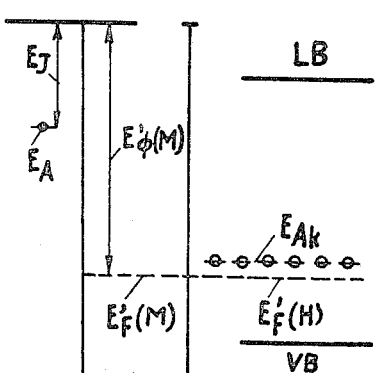
Fig. 6            Fig. 6a United States Patent Office 3,423,248
Patented Jan. 21, 1969

The electrodes preferably used for the electrochemical reactions of gaseous fuels or fuels dissolved in electrolytes and oxygen or air in fuel cells are gas diffusion electrodes whose activated inner surfaces formed by a pore system have a catalytic action on the electrochemical reactions. Suitable known eelctrodes are double skeleton catalyst electrodes which consist of an electrically conductive skeleton in which catalytically active Raney metal grains are embedded. The main disadvantages of these electrodes are, firstly, that the inner surfaces are only partly catalytically active since an appreciable part of the metal skeleton acts only as a support and secondly, that the process for the production of these electrodes is technically relatively complicated and expensive.

An eelctrode and a method of making it have been disclosed wherein the double-skeleton structure is abandoned in favor of a mono-skeleton structure. Acording to this disclosure a powder of a catalytically active metal is mixed with a powder of a catalytically inactive metal which is soluble in an alkaline solution or acid, the mixture is molded and sintered, the sintered molding being then treated with an alkaline solution or acid in order to dissolve the inactive components. Given a suitable composition for the powder mixture, this process gives a mechanically rigid porous skeleton of the active catalyst material but the disadvantage of the process is that a relatively low constant temperature must be maintained during the sintering operation required to produce the active surfaces since any minor variations in the temperature program for the sintering operation may result in a reaction between the two metals with a considerable heat evolution and destruction of the electrode. This will be explained briefly with reference to an example using the metals nickel and aluminum.

During sintering of the mixture of nickel and aluminium powder Ni/Al alloys are formed, the inactive aluminium subsequently being dissolved out of the same so that only the active nickel is left in the electrode body. It has now been found that a number of Ni/Al compounds are formed as final or intermediate products some of which have a highly exothermic formation reaction. As a result the rate of formation of the exothermic compound rises if there is too fast a temperature increase and the reaction heat that has to be carried off per unit of time increases correspondingly. If there is inadequate heat dissipation, there is a further acceleration of the reaction due to local overheating and this finally results in the entire electrode reaching the eutectic temperature of about 640° C. of the Ni/Al system and fusing together to form a compact regulus. Accordingly, a long period of time is required for production of the electrode owing to the need to maintain a relatively low sintering temperature.

Since the melting temperature of the eutectic of the two metals must not be exceeded even after a long sintering time it is impossible to obtain an optimum mechanical strength for the electrodes. The electrode thickness must therefore be made greater than really is necessary for the electrochemical reaction. This has an adverse effect on the volume and weight factor of the fuel cell.

It is also known to press and sinter silver powder of appropriate grain size for the production of gas diffusion electrodes, more particularly as oxygen or air electrodes in fuel cells. Since the silver powder consists of compact metal grains the electrodes are relatively heavy and expensive which are two adverse factors for economic fuel cells.

The object of the present invention is to provide a gas diffusion electrode for electrochemical fuel cells which is of lighter weight and cheaper than known gas diffusion electrodes while having active inner areas of at least equal size.

A further object of the invention is to provide a process for the production of a gas diffusion electrode wherein fusion of the pulverulent catalytically active and inactive metals during sintering is substantially impossible and wherein the sintering temperature is therefore substantially non-critical.

Another object of the invention is to provide a gas diffusion electrode which has a smaller polarization than known electrodes while having greater current loadability.

The process for the production of a gas diffusion electrode for electrochemical fuel cells, such electrode consisting of a cohesive metal skeleton having catalytically active inner surfaces, is characterized in that non-metallic high-melting grains are coated with at least one layer of a catalytically active metal and that the coated grains are pressed to form a molding and sintered.

The invention will be explained in detail hereinbelow with reference to the accompanying drawings in which:

FIGS. 5 and 5a show the effect of the doping of semiconductive non-metallic grains for an oxygen electrode in a fuel cell and generally for an electrode at which reduction reactions take place.

FIGS. 6 and 6a show the effect of the doping of semiconductive non-metallic grains for a hydrogen electrode in a fuel cell and generally for an electrode at which oxidation reactions take place.

Figure 1:
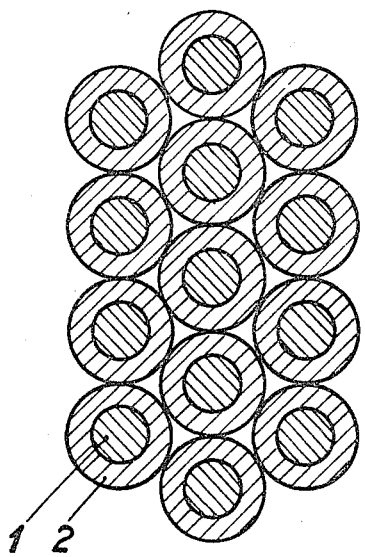
FIG. 1 is a diagrammatic cross section of one embodiment of the molding before sintering.

Referring to the drawings FIG. 1 is a section showing part of the molding as it appears, for example, after the first two stages of the process. To simplify matters the drawing shows a geometrically consistent arrangement. Reference numeral 1 denotes non-metallic high-melting grains which in the first stage of the process are coated with layers 2 of a catalytically active metal. In the second stage of the process the coated grains are pressed to form a molding as shown in FIG. 1. This molding is for example, in the form of a thin circular disc.

Figure 2:
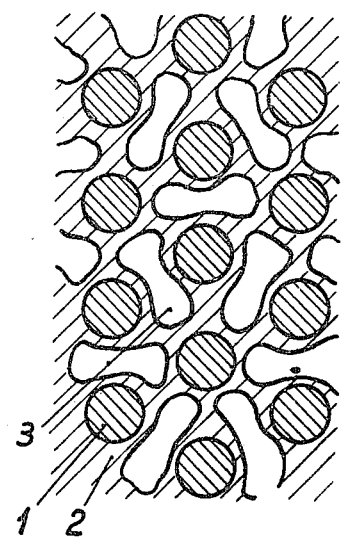
FIG. 2 shows the molding of FIG. 1 after sintering.

FIG. 2 is a section of the same molding after the third stage of the process, i.e., sintering. Reference 1 again denotes the non-metallic high-melting grains and 2 the catalytically active metal coatings which form the boundary layers of the pores 3 and which cover the grains on all sides. It will be apparent that since the melting point of the non-metallic grains in higher than that of the skeleton metal surrounding them it is impossible for the metal to destroy the pore structure by fusing together in the event of an unintentional increase in the sintering temperature, because the amount of metal and hence the amount of heat that is required to dissipate are much less due to the presence of the non-metallic grains than in the case of compact metal grains. The non-metallic grains also constitute an additional thermal capacity which acts as a buffer for reaction heat so that neighboring zones are not stimulated to any appreciably violent reaction. It will also be seen that the non-metallic grains increase the mechanical strength of the molding and provide a saving of skeleton metal so that the total weight of the electrode is reduced and production costs are lowered.

Suitable non-metallic grains are, for example, grains of a high-melting oxide such as thorium oxide, and silicon dioxide and mixed oxides of the spinel group, such as chromium oxide, cerium oxide, boron oxide and zirconium dioxide. High-melting sulphides may also be used for this purpose, such as those of cerium, thorium and uranium. Also advantageous are the oxides and sulphides of semi-conductor character, such as $ZnO$, $Al_2O_3$, $NiO$, $Fe_2O_3$, $CoFe_2O_4$ and $ZnS$ and other semi-conductive compounds such as $SiC$.

Suitable metals for coating of the grains and subsequent production of the catalytically active inner surfaces in the pores are nickel, cobalt, osmium, rhodium, ruthenium, gold, platinum, palladium, silver and cadmium. Coating is advantageously carried out electrolytically or by vapour coating. There is also a prior art process for the currentless metallization of pulverulent metal oxides or metal sulphides, wherein the powder is treated with reducing gases in an ammoniacal metallic salt solution.

The mean diameter of the non-metallic high-melting grains may be from 5 to $80\mu$ and is preferably between 20 and $40\mu$. The thickness of the catalytically active metal coating applied to the grains may vary between 1 and $30\mu$. Coating thicknesses of about $10\mu$ are very suitable.

The mean total diameter of the coated grains largely determines the pore width of the molded electrode after pressing and sintering of the grains. Instead of adapting the size of the coated grains to the required porosity it is advantageous to mix the coated grains with grains of an inert salt before pressing, the inert salt grains being dissolved out of the electrode by means of solvent after pressing and sintering. Suitable salts for this purpose are alkali metal chlorides, sulphates and carbonates which are removed from the sintered molding, for example, by boiling in distilled water.

The required sintering temperature and sintering time depend largely on the skeleton metal used. In the case of silver and cadmium a sintering temperature of from 500 to 600° C. has proved advantageous, for example, and for nickel a temperature of 650 to 700° C.

According to a further embodiment of the invention non-metallic high-melting grains are coated with a first coating of a catalytically active metal over which is applied a very thin second coating of about 0.01 to $0.05\mu$ of another catalytically active metal. This second coating need not be cohesive. In the electrode made from such grains by pressing and sintering the electronic and mechanical properties are determined by the metal of the first coating enclosing the non-metallic grains and the catalytic activity is determined by the second metal which is present only in a very thin thickness. Thus, for example, an oxygen electrode of very low polarization can be prepared by the use of $Al_2O_3$ grains coated with a nickel coating and then impregnated or second-coated with palladium. A hydrogen electrode having favorable electrochemical properties can be made, for example, by the use of non-metallic $SiC$ grains coated with nickel and then impregnated with platinum.

In another advantageous embodiment of the invention, more particularly for the production of electrodes suitable as hydrogen electrodes in fuel cells, the non-metallic high-melting grains are first coated with a coating of catalytically active metal and then coated with a second layer of a catalytically inactive metal soluble in alkaline solution, the coated grains are molded and sintered and finally the catalytically inactive metal is dissolved out with an alkaline solution. The catalytically inactive metal soluble in alkaline solution may, for example, be zinc, magnesium or, preferably, aluminum, while the catalytically active metal is one of the metals already mentioned, preferably nickel.

Figure 3:
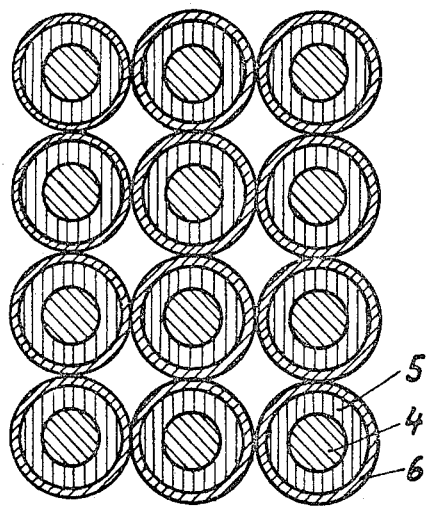
FIG. 3 is a diagrammatic cross section of another embodiment of the molding before sintering.

FIG. 3 is a section of part of a molding after pressing of the coated grains and before sintering. Reference numeral 4 denotes the non-metallic high-melting grains consisting, for example, of $Al_2O_3$. They are coated with a first layer 5 of a catylitically active metal, for example nickel and a second layer 6 of a catalytically inactive metal soluble in alkaline solution, for example aluminum. The coating thicknesses should be so selected that the volume of the catalytically inactive layer 6 is about 40 to 75% of the volume of the catalytically active layer.

Figure 4:
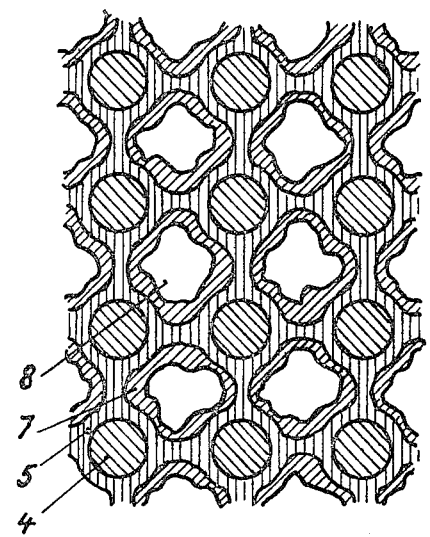
FIG. 4 shows the molding of FIG. 3, after sintering.

FIG. 4 is a section of the same molding shown in FIG. 3 after sintering and after the treatment with alkaline solution. Reference numeral 4 again denotes the non-metallic grains surrounded by a cohesive nickel coating 5. The pores 8 are bounded by a catalytically active metal layer 7 formed by the treatment of the nickel/aluminum alloy layer with alkaline solution.

When the molding shown in FIG. 3 is sintered the metals cannot fuse if the temperature rises above the eutectic temperature due to the heat liberated during the formation of the exothermic Ni/Al phases because there is only a relatively small quantity of reactive metal available in comparison to the total molding due to the presence of the non-metallic grains as bearer grains. Nor can any temperature increase occur very rapidly due to the thermal capacity of the nonmetallic grains. To improve the mechanical strength of the molding the sintering temperature can therefore be higher than the eutectic temperature of 640° C.

In an advantageous development of the invention the properties of metal coating which surrounds the non-metallic grains and which after pressing and sintering determines the electrochemical properties of the electrode, are favourably influenced by suitable treatment of said grains. One such treatment is based upon experience in heterogeneous gas catalysis. According to this the catalytic action of a metal is controlled by applying the metal to a semi-conductive supporting framework and controlling the position of the Fermi level in the supporting semi-conductor by doping so that the position of the Fermi level in the metal is also influenced via the metal-semi-conductor contact. It has now been found that the position of the Fermi level in the electrode metal is very important to the reaction in the chemisorption phase which is accompanied by an electron exchange. The reaction is determined by the relative position of the electron exchange level of the adsorbate in relation to the Fermi level of the metal. The electron exchange can therefore also be favorable controlled by a suitable variation of the Fermi level.

According to one embodiment of the invention, to this end, the grains in the form of a high-melting semi-conductive compound are so doped before coating that the Fermi level is lowered in the metal skeleton of an electron-receiving electrode and raised in the metal skeleton of an electron-emitting electrode. More particularly, in the case of a fuel electrode, such as a hydrogen electrode, a p-type semi-conductive compound is doped with an acceptor while in the case of an oxygen or air electrode an n-type semi-conductive compound is doped with a donator.

The effect of the doping will be explained in detail with reference to FIGS. 5, 5a, 6 and 6a.

FIGS. 5 and 5a diagrammatically illustrate the energy levels in the semi-conductive supporting core and in the metal coating for an oxygen electrode in a fuel cell, such electrode yielding electrons to the reaction gas $O_2$. FIG. 5 shows these conditions for the individual materials and FIG. 5a for the contacted materials. In both figures reference M denotes the metal, for example silver, and n-H the n-type semi-conductive compound which is coated with the metal, for example n-type $Al_2O_3$. Reference $E_A$ denotes the exchange level of the adsorbate with the ionization energy $E_J$, LB denotes the conductive band and VB the valency band in the semi-conductor.

In FIG. 5 reference $E_D$ denotes the donator level with which the semi-conductor has been doped. Between this level and the conductivity band LB is the Fermi level $E_F$ (H) of the semi-conductor. Reference $E_F$ (M) in the metal denotes the Fermi level thereof. The energy for the electron transfer from the metal to the adsorbate is therefore equal to the difference between the work function $E_\phi(M)$ and the ionization energy $E_J$.

FIG. 5a shows the corresponding levels after the semiconductive core has been brought into contact with the metal, the changed levels being denoted by the terms with the prime, $E'_\phi(M)$ and $E'_F(M)$ and $E'_F(H)$. On contacting, the Fermi level $E'_F(H)$ in the semi-conductor drops towards the donator level $E_D$. At the same time the Fermi level $E'_F(M)$ in the metal is raised. The work function $E'_\phi(M)$ is thus reduced as is also the transition energy for the electrons from the metal to the adsorbate.

As will be clear from FIGS. 6 and 6a, conditions are exactly the opposite in the case of a fuel cell hydrogen electrode by means of which electrons are received from the fuel gas $H_2$ (oxidation).

FIG. 6 diagrammatically illustrates the energy levels of the semi-conductive core and of the metal for the individual materials while FIG. 6a shows the same conditions for the contacted materials. In the two figures reference M again denotes the metal, for example, nickel, and p-H the p-type semi-conductive compound for coating with the metal, for example p-type SiC. The other references are the same as those in FIGS. 5 and 5a, the level of the acceptor with which the semi-conductor is doped being denoted by the reference $E_{AK}$. In the semiconductor the Fermi level $E_F(H)$ is now between the acceptor level $E_{AK}$ and the valency band VB. The transition energy for the electrons from the adsorbate in the chemisorption phase to the metal with the formation of a positive ion adsorbate ($H^+$) is shown in FIG. 6 as the difference between the work function $E_\phi(M)$ and the ionization energy $E_J$.

After contacting, as shown in FIG. 5a, the Fermi level $E'_F(H)$ in the semi-conductor is lifted towards the acceptor level. At the same time the Fermi level $E'_F(M)$ in the metal is lowered so that the transition energy for the electrons to the metal is increased. The transfer of electrons to the metal lattice is thus promoted and hence the course of the oxidation reaction in the chemisorption phase is advantageously influenced.

Further details of the process according to the invention are described in the following examples:

EXAMPLE 1

Grains of n-type $Al_2O_3$ of a mean diameter of $35\mu$ were used as support cores for the production of an oxygen electrode. The grains were coated with a silver layer of a thickness of $10\mu$. The silver-coated grains were pressed in a mold under pressure of 4000 kg. per sq. cm. to form an electrode plate of a diameter of 80 mm. and a thickness of 2 mm. The molding was then sintered for 1 hour at 580° C., advantageously in a quartz tube of a diameter of 100 mm. surrounded by a heating oven and having an hourly flow of 10 liters of hydrogen through the tube. The sintered molding was cooled to 150° C. at a rate of 5° C. per min. maximum. The electrode can be used in a fuel cell as an oxygen or air electrode without any further treatment. Its porosity is about 40%. For a weight of about 51 g. it has a weight saving of about 20% as compared with a sintered electrode of the same porosity made from silver powder.

EXAMPLE 2

Grains of carbon with a mean diameter of $30\mu$ were used as supporting cores for the production of an oxygen electrode. The carbon grains were coated with a silver layer of a thickness of $5\mu$. Subsequent pressing and sintering of the coated grains was preformed as in Example 1. The resulting electrode which is suitable as an oxygen or air electrode in a fuel cell has a porosity of about 50%. For a weight of about 37 g. the weight saving is about 36% as compared with a conventional electrode of the same porosity pressed from silver powder.

EXAMPLE 3

Grains of n-type $Al_2O_3$ of a mean diameter of $30\mu$ were used as support cores for the production of an oxygen electrode. The grains were coated with a nickel coating of a thickness of $10\mu$ and then impregnated with palladium to a coating thickness of about $0.01\mu$ or 0.3% by weight. The coated grains were pressed in a mold at a pressure of 5000 kg. per sq. cm. to form an electrode plate of 80 mm. diameter and 2 mm. thickness. Sintering was then carried out in a static protective gas atmosphere at 700° C. for 20 minutes. Cooling was advantageously at the rate of 4° C. per minute to a temperature of about 500° C. and then faster at a maximum of 10° C. per minute to a temperature of 150° C. The electrode, which can be used without any further treatment, is very suitable as an oxygen or air electrode since under a permanent load of 100 ma./cm.² it has a polarization below 270 mv. The electrode porosity is about 35%. The electrode weight is about 50 g., a saving of weight of about 13% as compared with a conventional palladium-impregnated nickel electrode of the same porosity.

EXAMPLE 4

Carbon grains with a mean diameter of $20\mu$ were used as cores for the production of an oxygen electrode. Some of the grains were coated with a silver coating of a thickness of $10\mu$ and the remainder with a cadmium coating of a thickness of $5\mu$. These coated grains were mixed in a conventional mixer, such as a rotating cube or a mortar, in a ratio of 84.7% by weight of C/Ag grains to 15.3% by weight of C/Cd grains. The grain mixture was then pressed at a pressure of 2500 kg. per sq. cm. to form an electrode of a diameter of 80 mm. and a thickness of 2 mm. The molding was sintered at a temperature of 500° C. for 2 hours in hydrogen. A rate of 7° C./minute maximum is advantageous for cooling. The electrode is suitable as an oxygen or air electrode without any further treatment since its polarization is less than 300 mv. for a continuous current density of 200 ma./cm². The electrode porosity is about 30% and the weight is about .57 g.

EXAMPLE 5

Grains of $Al_2O_3$ with a mean diameter of $20\mu$ were used as cores for the production of a hydrogen electrode. The grains were first coated with a nickel layer of $11\mu$ thickness and then an aluminum coating of $4\mu$ thickness. The coated grains were then pressed in a mold at a pressure of 4000 kg. per sq. cm. to form an electrode plate 80 mm. in diameter and 2 mm. thick. The molding was then sintered in flowing hydrogen as protective gas, the rate of flow being approximately 40 liters per hour. Sintering was carried out for 1 hour at 400° C. and then the temperature was slowly (i.e., at a rate of 1° C. per minute) raised to 645° C. and immediately reduced to 600° C. Further cooling was at the rate of 7° C. per minute to a minimum temperature of 200° C.

To activate the electrode some of the aluminum was dissolved out, the electrode being treated in the following stages with caustic potash, to which tartaric acid was added as a complex-former:

24 hours with n/10 KOH at 25° C.,
24 hours with 2 n KOH at 25° C.,
24 hours with 2 n KOH at 50° C.,
24 hours with 6 n KOH at 50° C.,
24 hours with 6 n KOH at 80° C.

The electrode porosity was about 50%; its weight about 33 g. The electrode is very suitable as a hydrogen electrode in $H_2/O_2$ fuel cells and as a hydrogen electrode in electrolysis equipment.

EXAMPLE 6

Grains of n-type $TiO_2$ with a mean diameter of $30\mu$ were used as cores for the production of a highly porous oxygen electrode. The grains were coated with silver coating about $10\mu$ thick. The coated grains were mixed for 2 hours in a mortar with 27% by volume of wind-sifted sodium carbonate with a mean grain size of $6\mu$ in order to increase the porosity. The powder mixture was then pressed in a mold at a pressure of 4000 kg. per sq. cm. and the molding was sintered at 580° C. for 2 hours in a current of hydrogen with a flow of 10 liters per hour. Cooling to 150° C. was at a rate of 5° C. per minute maximum.

The sodium carbonate was then dissolved out of the electrode by boiling out with distilled water. The operation was repeated in 30 minute cycles until conventional chemical processes showed no more salt in the water. The electrode porosity was about 60% and its weight about 36 g., corresponding to a saving of weight of 14% as compared with a silver powder electrode.

EXAMPLE 7

Grains of annealed n-type ZnO with a mean diameter of $35\mu$ were used as cores for the production of an oxygen electrode. To raise the Fermi level in the subsequently applied coating metal and in the order to improve the electrical conductivity, the support material was doped with a donator before being put into the granular form. The doping was with 0.18 mole-percent $Ga^+$ by diffusion by reaction in the solid state. The grains produced therefrom by comminution and sifting were then coated with a silver coating of a thickness of $5\mu$. To increase the porosity the coated grains were mixed for 2 hours in a mortar with 30% by volume of wind-sifted sodium carbonate with a mean grain size of about $8\mu$. The powder mixture was then pressed in a mold at a pressure of 4500 kg. per sq. cm. The molding was then sintered for 1 hour at 550° C. in an argon protective gas atmosphere. The subsequent cooling must not be in excess of 5° C. per mintue.

The sodium carbonate was finally dissolved out of the electrode by repeated boiling with distilled water for 30 minutes each time until conventional chemical processes showed no more salt in the water. The electrode porosity was about 45% and its weight about 44.5 g. The electrode is very suitable as an oxygen or air-electrode in a fuel cell.

EXAMPLE 8

Grains of p-type SiC with a mean diameter of $35\mu$ were used as cores for the production of a hydrogen electrode. The support material was doped with an acceptor before being put into the granular form, in order to lower the Fermi level in the subsequently applied coating metal and improve electrical conductivity. The doping was carried out with aluminum from the gas phase at 1600° C. and was continued until the resistance of the SiC was less than 0.05 ohm. The grains made therefrom by comminution and sifting were coated with a nickel coating of $5\mu$ thickness and then impregnated with palladium, i.e., about 2% by weight corresponding to a coating thickness of $0.4\mu$. To increase the porosity the coated grains were mixed for 2 hours in a mortar with 20% by volume of sodium carbonate with a mean grain size of $10\mu$. The powder mixture was pressed in a mold at a pressure of 5500 kg. per sq. cm. and then the molding was sintered for 35 minutes at 650° C. in a hydrogen protective gas atmosphere. Cooling can be at the rate of 10° C. per minute maximum.

The sodium carbonate was then dissolved out of the electrode by repeated boiling with distilled water for 30 minutes each time until no more salt could be detected in the water by conventional chemical methods. For a porosity of about 55% the electrode had a weight of 29 g. This means a saving in weight of about 39% as compared with a nickel powder electrode. The electrode is very suitable as a hydrogen electrode in fuel cells.

EXAMPLE 9

Grains of p-type NiO with a mean diameter of $35\mu$ were used as cores for the production of an electrode suitable as a hydrogen electrode in fuel cells. To lower the Fermi level the support material was doped with 0.5 mole-percent. $Li_2O$ as acceptor before being put into the granular form. The remaining steps of the process in this example were as in Example 8. The electrode had a porosity of about 48% and a weight of 43 g.

I claim:

1. A gas diffusion electrode consisting essentially of a skeleton of a catalytically active metal containing non-metallic high melting grains having a mean diameter between 5 and $80\mu$ embedded therein and intercommunicating pores, the pores being separated from said grains by a layer of skeleton metal of essentially constant thickness of from 1 to $30\mu$, while adjacent grains are interconnected by bridges of skeleton metal, said skeleton having a porosity of at least about 30%.

2. A gas diffusion electrode as defined in claim 1 in which the non-metallic high melting grains consist of a metal oxide.

3. A gas diffusion electrode as defined in claim 1 in which the non-metallic high melting grains consist of a metal sulfide.

4. A gas diffusion electrode as defined in claim 1 in which the non-metallic high melting grains consist of a semi-conductive material.

5. A gas diffusion electrode as defined in claim 4 in which the semi-conductive material is of the p-type and is doped with an acceptor.

6. A gas diffusion electrode as defined in claim 4 in which the semi-conductive material is of the n-type and is doped with a donator.

References Cited

UNITED STATES PATENTS

| | | | |
|---|---|---|---|
| 3,019,103 | 1/1962 | Alexander et al. | 75—212 |
| 3,150,011 | 8/1964 | Winsel et al. | 136—120 |
| 2,384,501 | 9/1945 | Streicher | 252—466 |
| 2,396,101 | 3/1946 | Hensel et al. | 75—222 |
| 2,406,172 | 8/1946 | Smithells | 252—466 |
| 2,627,531 | 2/1953 | Vogt | 136—20 |
| 2,701,326 | 2/1955 | Pfann et al. | 317—235 |
| 3,040,115 | 6/1962 | Moos | 136—120 |
| 3,068,311 | 12/1962 | Chambers et al. | 136—120 |
| 2,894,839 | 7/1959 | Matsukawa | 75—212 |
| 2,946,836 | 7/1960 | Justi et al. | 136—86 |

WINSTON A. DOUGLAS, *Primary Examiner.*

A. SKAPARS, *Assistant Examiner.*

U.S. Cl. X.R.

29—182.5